May 2, 1950 H. C. RIEMANN ET AL 2,506,109
VEHICLE BUMPER TOW CLAMP
Filed March 10, 1947 2 Sheets-Sheet 1
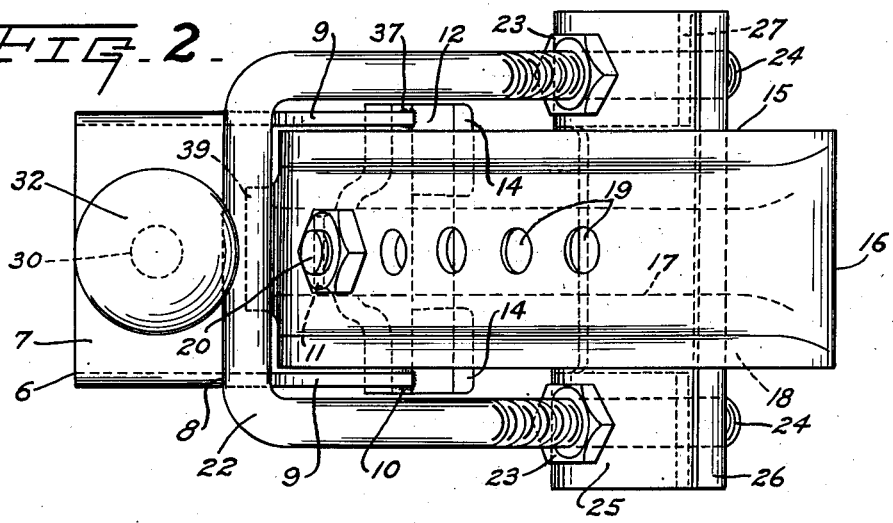
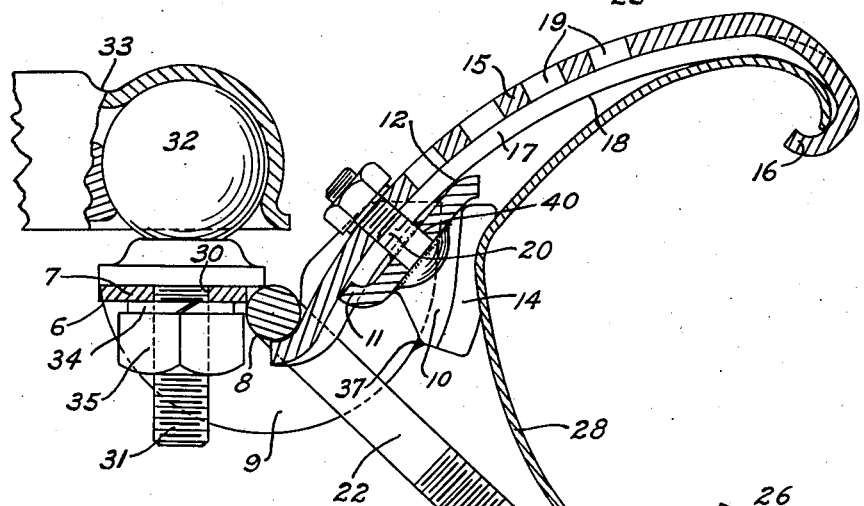
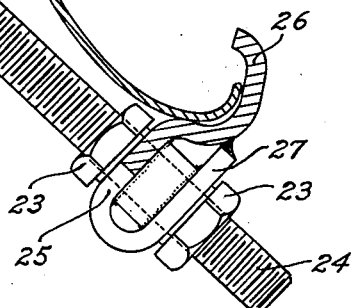

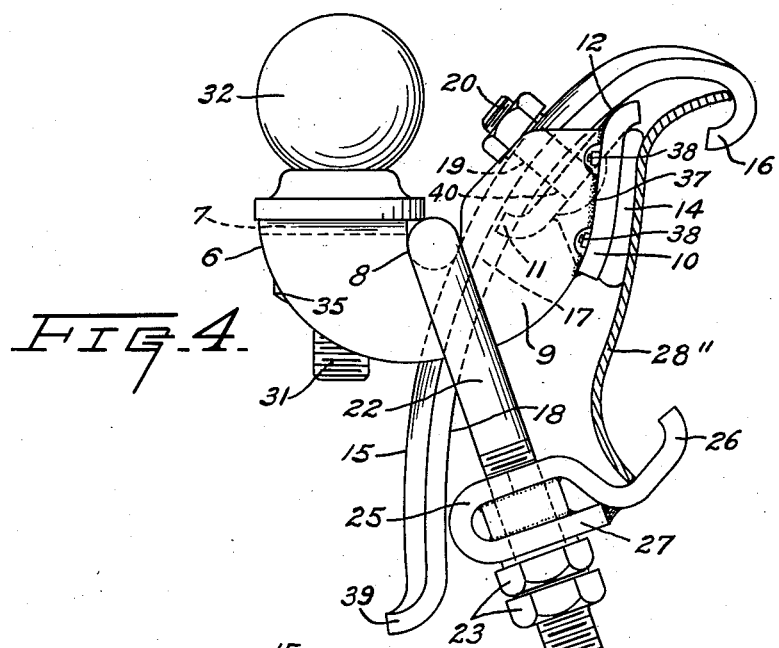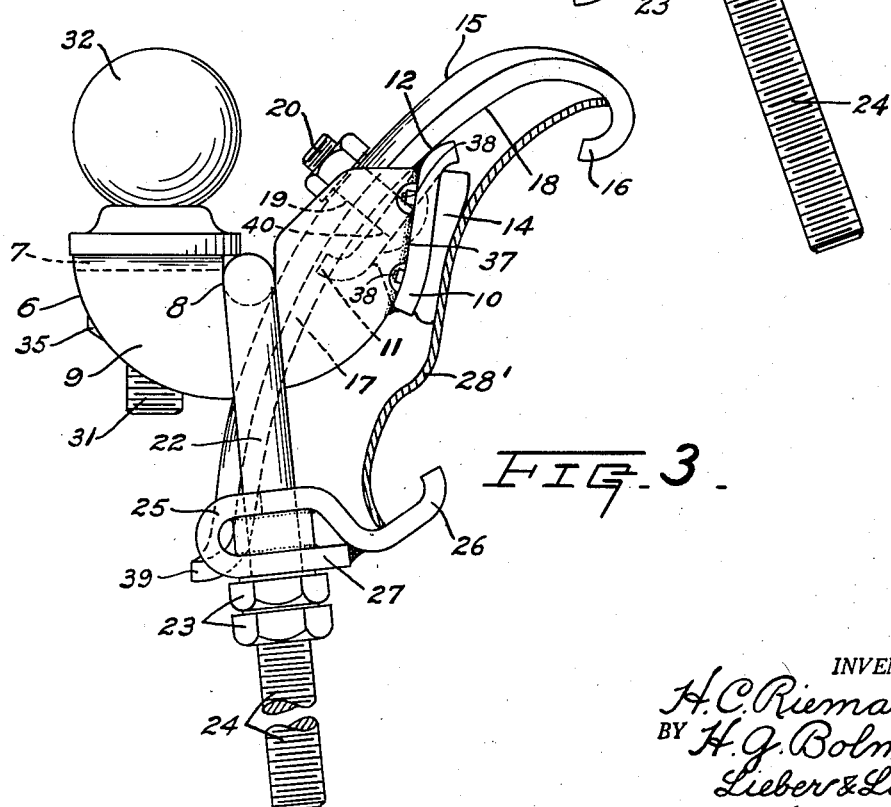

Patented May 2, 1950

2,506,109

UNITED STATES PATENT OFFICE 2,506,109

VEHICLE BUMPER TOW CLAMP

Howard C. Riemann, West Allis, and Henry G. Bolmes, Milwaukee, Wis., assignors to The Fulton Company, West Allis, Wis., a corporation of Wisconsin Application March 10, 1947, Serial No. 733,516

5 Claims. (Cl. 280—33.44)

Our invention relates in general to improvements in devices for interconnecting two normally independent vehicles in a manner whereby one may be hauled by the other, and relates more specifically to improvements in the construction and operation of tow clamps adapted to be attached to a bumper of either or both of the vehicles involved.

The primary object of this invention is to provide an improved vehicle bumper tow clamp which is simple and durable in construction, and which is also highly effective and reliable in use.

Many different types of so-called tow couplings or clamps intended for convenient attachment to the front or rear transverse bumper bars of automobiles in order to provide a haulage connection with another vehicle, have heretofore been proposed and utilized; but because of the varied cross-sectional shapes and sizes of the bumpers of the various pleasure cars and trucks, and with which these tow clamps must necessarily be cooperable, the prior devices were insufficiently flexible to effectively coact with the different bumper designs, and their utility was therefore extremely limited. Aside from this lack of flexibility in adaptation, these prior tow couplings were either too complicated and cumbersome to manipulate, or they were too weak to withstand the shock and abnormal pull, or they were too costly to manufacture and sell at moderate prices. The previous bumper tow clamps have therefore failed to become popular with the trade, principally due to their restricted usefulness and unsafe constructions.

It is therefore an important object of our present invention to provide an improved tow clamp adapted for quick and convenient attachment to the bumpers of most of the present standard automobiles, and which when properly attached affords a durable and safe vehicle hauling connection.

Another object of our invention is to provide a simple, compact and readily adjustable vehicle bumper clamp which may be universally movably associated with a trailer or with a draft vehicle so as to provide a highly efficient haulage connection or coupling.

A further object of the invention is to provide an improved bumper clamping unit, which is exceedingly flexible in its adaptations, and which may be manufactured at moderate cost and effectively applied for diverse uses.

Still another object of this invention is to provide a simple and inexpensive automobile towing accessory of great strength, which may be conveniently applied to and removed from bumpers of diverse shapes and dimensions, with utmost safety and without marring or damaging the bumper bars and adjacent structure.

These and other specific objects and advantages of the present improvement will be apparent from the following detailed description.

A clear conception of the features constituting our present invention, and of the mode of constructing and of utilizing vehicle bumper tow clamps embodying the improvements, may be had by referring to the drawings accompanying and forming a part of this specification and in which like reference characters designate the same or similar parts in the various views.

Fig. 1 is a central vertical section through one of our improved tow clamps, showing the same cooperating with a ball and socket type of coupling and clampingly engaging a bumper bar of the class applied to modern Oldsmobile automobiles;

Fig. 2 is a top view of the bumper clamp assemblage adjusted to correspond with the showing in Fig. 1;

Fig. 3 is a side elevation of the improved tow clamp unit properly adjusted and applied to a bumper bar of the class applied to modern Ford automobiles, the bumper bar being shown in section; and Fig. 4 is another side elevation of the improved bumper clamping tow unit properly adjusted and applied to a bumper bar of the class applied to modern Hudson automobiles, the bumper bar also being shown in section.

While the improved vehicle bumper tow clamp assembly has been illustrated as having been applied to only three different classes or styles of automobile bumpers, it is not our desire or intention to thereby limit the utility of these clamps, since they are just as readily and effectively applicable to the bumpers of many other types of cars such as the Cadillac, Plymouth, Chevrolet, Dodge, DeSoto, Chrysler, Pontiac, Mercury, Lincoln, Packard, Buick, Kaiser, Frazer, and perhaps also others.

Referring to the drawings, our improved bumper clamp as shown therein, comprises in general an inverted U-shaped draft frame 6 having a deck or platform 7 at one end and alined upwardly open sockets 8 formed in its opposite side walls 9 near the platform 7; a transverse bracket 10 rigidly attached to and spanning the gap between the frame walls 9 remote from the platform 7 and being provided with a bearing plate having a medial lower projection 11 extending toward the frame platform while its uppermost portion is provided with a curved or forwardly and downwardly inclined bearing surface 12; a pair of stiff rubber pads or blocks 14 secured to the opposite outer side portions of the bracket 10; an upper arcuate clamping jaw 15 having an end clamping hook 16, and a central groove 17 and adjacent opposite lower side surfaces 18 adapted to coact respectively with the bracket projection 11 and contact surface 12, the jaw 15 also being provided with a series of spaced openings 19 for interchangeably receiving a stud or bolt 20 which coacts with the bracket 10; an elongated member or U-bolt 22 swingably suspended from the frame 6 at the sockets 8 and having clamping nuts 23 coacting with each of its threaded swinging ends 24; and a lower transverse clamping jaw 25 having a clamping hook 26 extending across and beneath the upper jaw hook 16 and being provided with spaced side portions 27 which are pierced by the threaded U-bolt ends 24 and are cooperable with the nuts 23 to firmly clamp bumper bars 28 of diverse shapes and sizes between the jaw hooks 16, 26 and against the resilient blocks 14.

The main frame 6 may be formed of heavy sheet metal with the aid of punches and dies, and the horizontal deck or platform 7 is provided with a central hole 30 for facilitating attachment of a coupling or draft member to the bumper clamping unit. As shown, the attaching bolt 31 of the ball member 32 of a universal ball-and-socket type draft coupling 33, has been inserted through the frame deck hole 30, and the spherical member 32 has been clamped to the platform 7 with the aid of a lock washer 34 and a nut 35 coacting with the bolt 31, see Fig. 1. The platform 7 is formed integral with the opposite depending side walls 9, and since the saddle sockets 8 are disposed closely adjacent to frame deck, they will be rigidly retained in true axial alinement at all times. The bracket 10 may also be formed of durable sheet metal with the aid of punches and dies, and the opposite ends of this bracket 10 are preferably firmly attached to the adjacent edges of the frame walls 9 by heavy welds 37, thereby thoroughly reenforcing and stiffening the frame assemblage.

The laterally spaced resilient reaction blocks 14 are preferably formed of relatively stiff or hard rubber, but they should be sufficiently pliable so that they will distort as shown in Figs. 1, 3 and 4 when a bumper is pressed and clamped thereagainst. These rubber blocks 14 may be firmly secured to the opposite flat ends of the bracket 10 by means of rivets 38 shown in Figs. 3 and 4, or otherwise, and the heads of these rivets 38 should be embedded within the blocks 10 in order to avoid metal to metal contact with the bumpers. The extreme end of the bracket projection 11 and the upper contact surface 12 should be relatively smooth and so positioned that they will firmly cooperate with the central groove 17 and side surfaces 18 respectively of the arcuate clamping jaw 15, and the jaw 15 may be likewise formed of heavy sheet metal with the aid of punches and dies. The hook 16 is formed integral with the upper end of the jaw 15, and the lower end of the jaw 15 may be bent outwardly to provide a stop 39 cooperable with the transverse portion of the U-bolt 22 to prevent the jaw 15 from being pulled out of the clamp assemblage.

The clamping stud 20 snugly fits and may be welded within a central hole 40 formed in the bracket 10, and is adapted to cooperate with any of the series of openings 19 formed in the arcuate jaw 15. When the arcuate jaw 15 is removed from the fixed stud 20, it may be shifted so as to bring any desired opening 19 into axial alinement with this stud, thus providing an extensive range of adjustment for the upper jaw 15 and its clamping hook 16. The stud 20 may thereafter be inserted into the selected opening 19 and clamped in position as shown in Fig. 1, to firmly maintain the jaw 15 in the desired position of adjustment. The U-bolt 22 which is pivotally suspended in the frame sockets 8, and which carries the lower jaw 25, is swingable about these sockets 8 so as to move the jaw 25 and its clamping hook 26 back and forth, and the nuts 23 are adjustable along the threaded U-bolt ends 24 to place the lower jaw 25 in any desired position along the U-bolt 22, thus also providing an extensive range of adjustment of the jaw 25 and hook 26. The nuts 23 may be applied either as shown in Figs. 1 and 2, or as illustrated in Figs. 3 and 4, and coact with the lower jaw portions 27 to lock this jaw assemblage in adjusted position.

When the various parts of the improved bumper clamping unit, have been properly constructed as above described, they may be assembled and relatively adjusted to fit the bumper bars of various types of automobiles, by merely initially adjusting and properly positioning the upper clamping jaw 15, and by thereafter adjusting and manipulating the lower jaw 25. As shown in Fig. 1, the improved assemblage has been applied and clamped firmly to a standard Oldsmobile bumper bar 28, the upper edge of which has been clamped within the upper jaw hook 16, and the lower edge of which has likewise been clamped within the lower jaw hook 26, while the intermediate ridge portion of the bar 28 is pressed against the rubber blocks 14 with sufficient presure to indent these resilient blocks and to hold the bar edges firmly within the hooks 16, 26. As depicted in Fig. 3, the improved unit has been likewise applied and firmly clamped to a standard Ford bumper bar 28', with the upper edge of the bumper clamped within the upper hook 16, and the lower edge clamped within the lower hook 26, while the upper medial portion of the bar 28' is pressed against the resilient blocks 14 with pressure sufficient to deform these blocks and to hold the bar edges firmly within the hooks 16, 26. As illustrated in Fig. 4, the improved tow clamp has been applied and firmly clamped to a standard Hudson bumper 28'', so that the upper bar edge is clamped within the upper hook 16, and the lower bar edge is clamped within the lower hook 26, while the upper intervening portion of the bar 28'' is pressed against the resilient blocks 14 with force sufficient to distort the blocks and to hold the bar edges firmly within the clamping hooks 16, 26.

The improved device may be thus quickly and conveniently applied and firmly clamped to various other styles and sizes of bumper bars, by merely initially adjusting the upper jaw 15 to accommodate varying horizontal widths in the bumper cross-sections, and by thereafter adjusting the lower jaw 25 along the threaded ends of the U-bolt and swinging this bolt fore or aft so as to cause the hooks 26 to properly engage the lower bumper edge, and by finally manipulating the nuts 23 so as to effect firm clamping attachment of the unit to the bumper bar. The three point contact afforded by the edge engaging hooks 16, 26 and by the intermediate blocks 14, combined with the resiliency of the latter, insures continued firm attachment of the appliance without permitting undesirable looseness or rattling of parts, and the resilient metallic construction of the lower jaw 25 and of the flanges 27 serves to lock the nuts 23 in adjusted clamping position. Any desired type of draft mechanism, other than the ball-and-socket coupling 33 specifically shown, may be applied to the main frame 6 either at the hole 30 or elsewhere, and the towing unit may be associated either with the front or rear bumper bars of diverse vehicles.

From the foregoing detailed description of our invention, it should be apparent that we have in fact produced a vehicle bumper tow clamp which besides being simple, compact and durable in construction, is also highly efficient in use and extremely flexible in its adaptations. The main frame 6, bracket 10, upper clamping jaw 15, and lower clamping jaw 25 may all be readily produced from heavy sheet metal and at moderate cost, with the aid of punches and dies; and except for the resilient pads or blocks 14, all of the other parts comprising bolts and nuts are of relatively standard construction. The jaws 15, 25 may however be formed of materials other than sheet metal, without departing from the present invention, and it has in fact been found desirable in some instances to form the lower jaw 25 of a casting in order to insure adequate bearing surface at the U-bolt 22. The improved assemblage is safely and readily applicable to the bumpers of most standard automobiles, with the aid of an ordinary wrench, and may be carried in the tool boxes of cars and trucks as an accessory always ready for convenient use especially in case of emergency. The improved towing attachment may be applied to plated and polished bumpers without damaging or marring the same, and has been found highly satisfactory and successful in actual use. By utilizing a universal coupling 33 in conjunction with our improved tow clamp, the unit is relieved of dangerous abnormal stresses which might otherwise tend to bend the metal parts, and the use of such a ball-and-socket coupling 33 makes the bumper clamp well adapted for trailer haulage purposes.

It should be understood that it is not desired to limit this invention to the exact details of construction or to the precise mode of use, herein shown and described, for various modifications within the scope of the appended claims may occur to persons skilled in the art; and it is also contemplated that specific descriptive terms employed herein be given the broadest possible interpretation consistent with the disclosure.

We claim:

1. A vehicle bumper tow clamp comprising, a draft frame having a wall provided with a transverse pivot socket and also having a bracket extending transversely of the wall and provided with a resilient bumper engaging block disposed rearwardly of the socket, an elongated member swingably suspended from said socket and having a lower bumper clamping jaw suspended from its lower swinging end and adjustable toward and away from the socket, said bracket having a bearing plate provided with an upper downwardly and forwardly inclined bearing surface located forwardly of said block, and an upper bumper clamping jaw having an elongated similarly inclined supporting surface movable along said bearing surface and adjustably attachable to said plate.

2. A vehicle bumper tow clamp comprising, a draft frame having a wall provided with a transverse pivot socket and also having a bracket extending transversely of the wall and provided with a resilient bumper engaging block disposed rearwardly of the socket, an elongated member swingably suspended from said socket and having a lower bumper clamping jaw suspended from its lower swinging end and adjustable toward and away from the socket, said bracket having a bearing plate provided with an upper downwardly and forwardly inclined bearing surface located forwardly of said block and said plate having an upwardly extending projection thereon, and an upper bumper clamping jaw having an elongated similarly inclined supporting surface and a recess cooperable with said projection and being movable along said bearing surface and adjustably attachable to said plate.

3. A vehicle bumper tow clamp comprising, a draft frame having spaced walls each provided with a transverse pivot socket and also having a bracket spanning the space between said walls and provided with a resilient bumper engaging block disposed rearwardly of the sockets, an elongated member swingably suspended from said sockets and having a lower bumper clamping jaw suspended from its lower swinging end and adjustable toward and away from the sockets, said bracket having a bearing plate provided with an upper downwardly and forwardly inclined bearing surface located forwardly of said block, and an upper bumper clamping jaw having an elongated similarly inclined supporting surface movable along said inclined bearing surface and adjustably attachable to said plate.

4. A vehicle bumper tow clamp comprising, a draft frame having spaced walls each provided with a transverse pivot socket and also having a bracket spanning the space between said walls and provided with a resilient bumper engaging block disposed rearwardly of the sockets, an elongated member swingably suspended from said sockets and having a lower bumper clamping jaw suspended from its lower swinging end and adjustable toward and away from the sockets, said bracket having a bearing plate provided with an upper downwardly and forwardly inclined bearing surface located forwardly of said block and said plate having an upwardly extending projection thereon, and an upper bumper clamping jaw having an elongated similarly inclined supporting surface and a central recess cooperable with said plate projection and being movable along said bearing surface and adjustably attachable to said plate.

5. A vehicle bumper tow clamp comprising, a draft frame having spaced walls each provided with a transverse pivot socket and also having a bracket spanning the space between said walls and provided with a resilient bumper engaging block disposed rearwardly of the sockets, an inverted U-bolt swingably suspended from said sockets and having a lower bumper clamping jaw suspended from its lower swinging end and adjustable toward and away from the sockets, said bracket having a bearing plate provided with an upper convexly arcuate surface generated about a center located below and rearwardly of the bumper engaging face of said block, and an upper bumper clamping jaw having an elongated similarly arcuate supporting surface movable along said bearing surface and adjustably attachable to said plate.

HOWARD C. RIEMANN.
HENRY G. BOLMES.

REFERENCES CITED

The following references are of record in the file of this patent:

UNITED STATES PATENTS

| Number | Name | Date |
| --- | --- | --- |
| 2,306,007 | Thorp | Dec. 22, 1942 |